United States Patent
Wang

(10) Patent No.: US 7,682,513 B2
(45) Date of Patent: Mar. 23, 2010

(54) WATER DECHLORINATION MEANS

(76) Inventor: Desheng Wang, 140 S. Roosevelt Ave., Pasadena, CA (US) 91107

( * ) Notice: Subject to any disclaimer, the term of this patent is extended or adjusted under 35 U.S.C. 154(b) by 1738 days.

(21) Appl. No.: 10/268,486

(22) Filed: Oct. 10, 2002

(65) Prior Publication Data

US 2004/0069719 A1   Apr. 15, 2004

(51) Int. Cl.
*C02F 1/68* (2006.01)

(52) U.S. Cl. .................... 210/749; 210/198.1; 222/187

(58) Field of Classification Search ............ 210/749, 210/192, 198.1, 205; 222/187, 190; 137/268; 239/10, 44, 145
See application file for complete search history.

(56) References Cited

U.S. PATENT DOCUMENTS

| | | | |
|---|---|---|---|
| 4,107,046 A | 8/1978 | Corder | |
| 4,172,796 A | 10/1979 | Corder | |
| 4,504,389 A | 3/1985 | Rundzaitis | |
| 4,642,192 A | 2/1987 | Heskett | |
| 4,787,973 A * | 11/1988 | Ando et al. | 210/282 |
| 4,816,177 A * | 3/1989 | Nelson et al. | 252/181 |
| 5,122,274 A | 6/1992 | Heskett | |
| 5,152,464 A | 10/1992 | Farley | |
| 5,300,224 A | 4/1994 | Farley | |
| 5,384,102 A * | 1/1995 | Ferguson et al. | 422/264 |
| 5,395,625 A * | 3/1995 | Tang | 424/464 |
| 5,914,043 A | 6/1999 | Farley | |
| 6,056,875 A | 5/2000 | Farley | |
| 6,138,703 A * | 10/2000 | Ferguson et al. | 137/1 |
| 6,245,230 B1 * | 6/2001 | Ricci | 210/232 |
| 6,264,846 B1 * | 7/2001 | Smith | 210/749 |
| 6,294,096 B1 * | 9/2001 | Pate | 210/749 |
| 2004/0046149 A1 * | 3/2004 | Meyer | 252/175 |

* cited by examiner

*Primary Examiner*—Frank M Lawrence
(74) *Attorney, Agent, or Firm*—Gary F. Wang

(57) ABSTRACT

A device for water dechlorination that includes a housing containing a water-soluble dechlorination media, one or more fluid transfer media that passes through the housing that allows the transfer of water and water-soluble dechlorination media between the inside of the housing and the outside of the housing, and a mechanism for directing water to flow through the one or more fluid transfer media. The chlorine in the water is removed or neutralized by the water-soluble dechlorination media released through the one or more fluid transfer media.

16 Claims, 2 Drawing Sheets

WATER DECHLORINATION MEANS

BACKGROUND

1. Field of Invention

This invention relates generally to filters for treating water. More specifically, this invention relates to a water filter that neutralizes harmful substances, such as chlorine and chloramines which is absorbed by the human body during contact or consumption.

2. Description of Related Art

As discussed in detail in U.S. Pat. No. 5,300,224, which issued Apr. 8, 1994 to Frederick A. Farley, chlorine is a very effective disinfectant and has been used in municipal water for nearly 100 years. The growing concerns about chlorine in water are the chlorination by products, "chlorinated hydrocarbons," known as trihalomethanes ("THM"). Most THM's are formed in tap water when chlorine reacts with naturally occurring substances. Risks for certain types of cancer are now being correlated to the use of chlorinated water. Studies are now beginning to show that humans can consume large amounts of chlorine in the shower. These effects of chlorine may result from either ingestion or absorption through the skin. There is also evidence that shows that chlorine can destroy protein in our body and cause adverse effects on skin and hair. The presence of chlorine in water may also contribute to the formation of chloramines in water, which can cause taste and odor problems. Since chlorine is required by public health regulations to be present in all public tap water supplies, it is up to the individual to remove it at the point-of-use in the home.

Activated carbon filtration ("AC") is effective in reducing certain organic chemicals and chlorine in cold water. Chlorine is attracted to and held (absorbed) onto the surface of the carbon particles. U.S. Pat. No. 4,107,046 discloses a filter cartridge for an internally by-passable water purifier apparatus. The apparatus includes valve means for directing water through the filter cartridge, which contains granulated carbon mixed with a silver zeolite, and may be sandwiched between fibrous sheets of material, such as felt, before it exits the apparatus. U.S. Pat. No. 4,172,796 discloses a water faucet having water purification or filtering means, made from activated carbon, or carbon with oligodynamic silver, formed therein. U.S. Pat. No. 4,504,389 discloses a water faucet having a separate housing containing a removable cartridge or filter element made from various stages of polyethylene and activated carbon particles therein. However, high water flow rate and high water temperature limits carbon's water filtration efficiency. The efficiency of absorption is quickly nullified when the water becomes warm. The lifetime of an activated carbon filter is very short. An activated carbon filter gets clogged very quickly by the dirt it is meant to stop. As soon as that happens, it immediately starts to release previously adsorbed contaminants back into the water stream.

Another type of filter media called KDF is disclosed in U.S. Pat. Nos. 4,642,192 and 5,122,274, which is an "electronegative cell potential type" chlorine filter media. The preferred media to filter out chlorine disclosed in these patents is comprised of a mixture of copper and zinc.

Two types of shower filters devices are disclosed in U.S. Pat. Nos. 5,152,464 and 5,300,224. The devices disclosed in these patents are compact filter assemblies containing a filtering media, such as copper and zinc, to filter out unwanted chlorine in water passing through the filters. However, copper and zinc media does not remove chloramines and, because its efficiency depends on water temperature, it does not work well in cold water. There are several other limitations using KDF as a de-chlorinating agent. KDF filters are also affected by water pressure. When the water pressure is not high enough, water simply cannot pass through the KDF powders. Another major problem of KDF filters is that the lifetime of the filter depends on the quality of the water passing through it. When the quality of the water is bad, the dirt a KDF filter removes from the water quickly covers the surface of the KDF that in turn makes the filter ineffective very quickly.

U.S. Pat. Nos. 5,914,043 and 6,056,875 disclose a method of filtering water utilizing separate beds of non-soluble ceramic-type calcium sulfite beads, made from a ceramic binder and calcium sulfite, and a copper-zinc media. Sulfur-based compounds, such as calcium sulfite or sodium sulfite (or sulfate), although are effective dechlorinating agents, can be toxic to both humans and animals. The addition of excess sulfite and sulfate chemicals to our water has always been a concern. There remains the need in the art for a safer and more environmentally conscious filter that provides the most efficient filtering of unwanted chlorine from water while at the same time meeting the more stringent health and safety regulations of local communities and governmental agencies such as the EPA.

Vitamin (ascorbic acid or sodium ascorbate) reacts rapidly and stoichiometrically with active chlorine and has limited interactions with disinfection byproducts. It fully neutralizes both chlorine and chloramines. There are several powerful arguments for using Vitamin instead of KDF, activated carbon, or sulfur-based compounds as dechlorination agents. Vitamin utilizes ascorbic acid chemistry for dechlorination. It is made with an essential vitamin for humans and many animals, which are known to boost the immune system, and improves the skin and hair condition of humans. It is also the safest and least toxic of dechlorination agents.

SUMMARY OF THE INVENTION

It is an object of the present invention to provide an improved water filtration method. It is a particular object of the present invention to provide an improved method for neutralizing chlorine from water. It is yet a more particular object of the present invention to provide an improved water filtering method using water-soluble media, preferably, but not limited to, ascorbic acid (Vitamin C) or sodium ascorbate.

The water filter of the present invention includes a replaceable cartridge which contains Vitamin (ascorbic acid or sodium ascorbate).

The replaceable cartridge include fluid transfer media or welt which is made of porous materials such as natural or synthetic felt or wick materials, this fluid transfer media is used to transfer water soluble dechlorination media to the water.

Fluid mixer means is provided for mixing the water and Vitamin received by the fluid combination means to provide a substantially homogeneous mixture of water and dechlorination media.

The water filter also includes fluid flow path defining means forming a confined flow path for receiving the substantially homogenous mixture of water and water soluble dechlorination media. The confined flow path has a length sufficient to provide substantially complete dechlorination of water.

The fluid mixer means comprises an inline static mixer providing substantially complete transverse mixture uniformity with minimal longitudinal mixing of the combined water and Vitamin through the fluid mixer means.

Other features, advantages and objects of the present invention will become apparent with reference to the following description and accompanying drawings.

DETAILED DESCRIPTION OF THE PREFERRED EMBODIMENT

Figure 1:
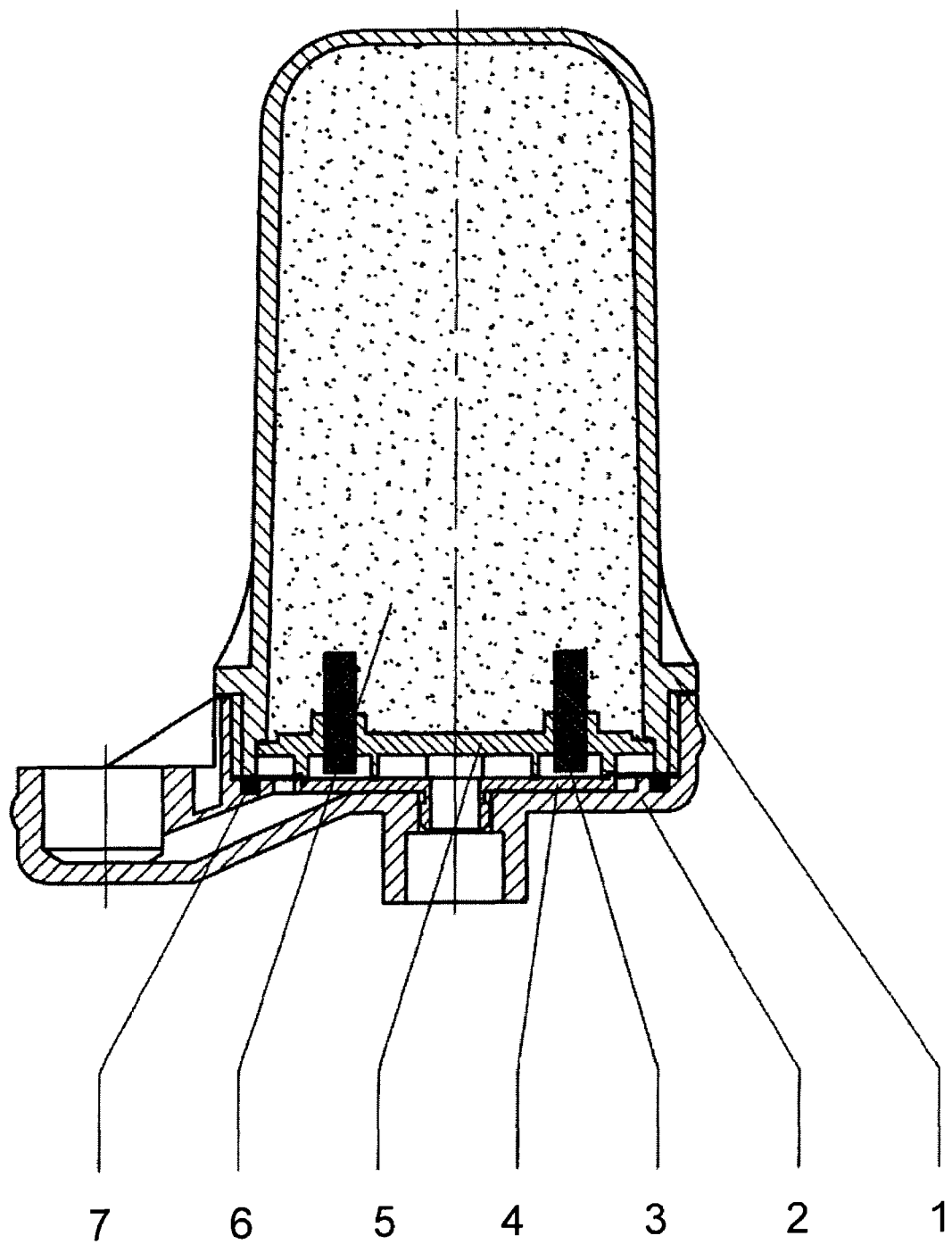
FIG. 1 shows a cross sectional view of the preferred embodiment of the water dechlorination means.

A preferred embodiment of the present invention incorporates a replaceable cartridge. As shown in FIG. 1, the cartridge comprises of a water soluble dechlorination media housing 1 with a housing cover 5 enclosing a water-soluble dechlorination media 6 and multiple fluid transfer medias 3, preferably formed of wick materials or felt made of natural or synthetic fibers. An internal cover 4 covers the housing cover 5 defining a water flow path between them. A cover 2 encloses the end of the housing 1 with the multiple fluid transfer medias 3 and seals the water flow path with a seal 7. The fluid transfer medias 3 transfer high concentration of water soluble dechlorination media solution from the housing 1 to the water and neutralize the chlorine in the water. Two fluids transfer medias 3 are preferred. The water dechlorination means also includes fluid flow path defining means forming a confined flow path for receiving the mixture of water and water soluble dechlorination media 6. The confined flow path has a length sufficient to provide substantially complete dechlorination of water. The fluid flow path defining means has an exit for water in the confined flow path after substantially complete dechlorination of water. The water first enter the water inlet of the cartridge and divided into two water streams, each water stream passes through a fluid transfer media 3 where it mixes with high concentration of water soluble dechlorination media solution 6 from the housing 1 and then combines to exit as one stream. As a result, the water is thoroughly mixed with the water soluble dechlorination media 6 and dechlorination efficiency is improved. A seal 7 is included in the cartridge so that water is forced to pass though the confined water paths so that the water has to pass though the fluid transfer media 3 and mix with the water soluble dechlorination media 6. The water soluble dechlorination media 6 can be any water soluble agents such as Vitamin (ascorbic acid or sodium ascorbate) or sulfur-based compound, preferably Vitamin because of the safety and effectiveness of Vitamin.

Figure 2:
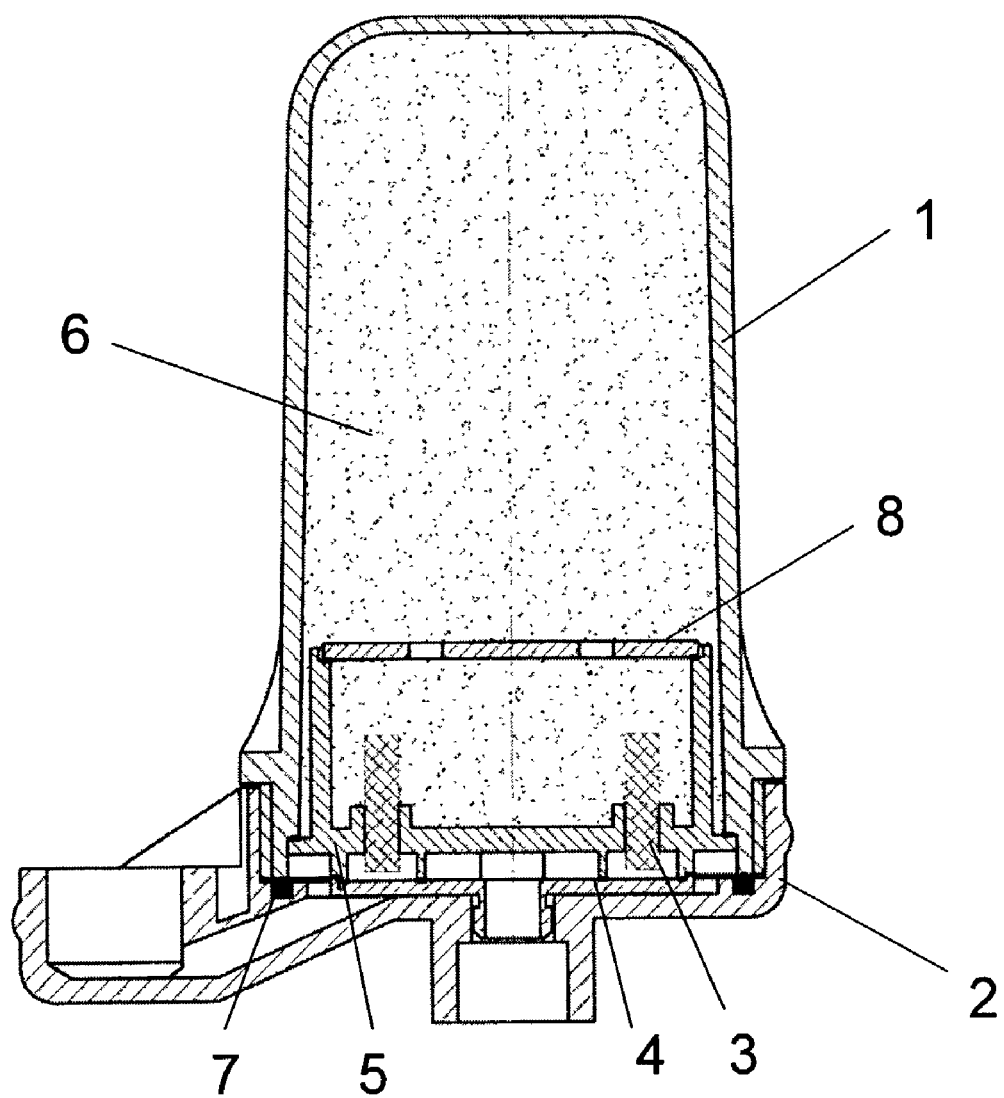
FIG. 2 shows a cross sectional view of another embodiment of the water dechlorination means.

Another embodiment of the present invention includes two compartments within the housing 1. As shown in FIG. 2, a perforated divider 8 is used to divide the housing 1 into two compartments. The perforated divider 8 may have multiple openings of suitable diameter to allow passage of solution of water soluble dechlorination media 6. Water pass through the confined water path and fluid transfer media 3, mix with water soluble dechlorinaton media 6, in the initial stage, only water enters the housing 1, no noticeable release of water soluble dechlorination media to the water was found, until the housing 1 has water which is more than 25% of the weight of water soluble dechlorination media 6, roughly 200 to 250 grams of water soluble dechlorination media 6 was used in the current example, which requires more than 50 grams of water.

If more than 50 grams of water was added to housing 1 before it was sealed, total neutralization of chlorine in water will occur instantly. This cartridge can operate continuously for more than 130 hours with 250 grams of Vitamin C in the cartridge. However, this design has the disadvantages that water has to be added to cartridge, and water may leak from the cartridge during shipments. This is a potential problem, even though porous materials was added in the cartridge to prevent the water from leakage, still it is difficult to prove whether that works for long durations. Another possible problem is that water may evaporate during long term storage. A perforated divider 8, as shown in FIG. 2 is inserted in the housing 1 and divides the housing 1 into two compartments wherein the smaller compartment has approximately 5-10% of the total cartridge volume. Each compartment is filled with water soluble dechlorination media 6, the perforated divider 8 has multiple holes through it so that the water can pass through the holes from one compartment into the other compartment. The diameters of holes are chosen so that when the water soluble dechlorination media 6 in one compartment is almost used up the other compartment will start to supply high concentration of water soluble dechlorination media 6. An example of this improved design is given in FIG. 2. One compartment is filled with 20 grams of Vitamin C and 230 grams of Vitamin C is filled in the other compartment, a total neutralization of chlorine was observed with in five minutes without adding any water into cartridge. The 20 grams of Vitamin C in one compartment is capable of working continuously for 10 hours, and within the 10 hours, the other compartment is filled with water and start to supply high concentration of Vitamin C solution into the first compartment so that the cartridge continue to release Vitamin C into the water and neutralize the chlorine. When water stops flowing, the cartridge also stops releasing water soluble dechlorination media 6 and all the remaining water soluble dechlorination media 6 is kept in the cartridge, the overall principal is similar to that used in ink pens, the inks is kept in pen even the pen is kept up side down and is able to transfer ink by fluid transfer media. 130 hours of life time of the cartridge was also reproduced in this design. 250 grams of Vitamin in principal is capable of neutralizing 1 ppm (parts per million) chlorine in 25,000 gallons of water. Different levels of chlorine in the water will affect the actual results. The diameter of the fluid transfer media 3 is chosen so that the cartridge is capable of neutralizing chlorine for 130 hours at flow rate 2.5 gallons per minutes, or equivalently, 19,500 gallons of water. This design is also capable of total neutralizing chlorine at flow rate as high as 3 gallon per minutes without sacrificing the life expectancy. For flow rate higher than 3 gallons per minutes, a larger diameter fluid transfer media 3 has to be used, the life expectancy may be shortened if the volume of the cartridge remains unchanged. Since the flow rate of ordinary shower heads does not exceed 3 gallons per minutes, and reaction rate of Vitamin with chlorine is fast, the life expectancy of the present invention is almost constant and independent of the temperature, pressure, and quality of water. The problems of the current filters on the market which use activated carbon, KDF, or sulfur-compound media are eliminated. The present invention also can use sulfur-compound as dechlorination media. The life expectancy is even longer than that of Vitamin ones, and sulfur-compound dechlorination media is also much cheaper than that of Vitamin. However, Vitamin is much safer.

Yet another embodiment of the present invention first mixes the Vitamin with boiling water to create a saturated solution. When this saturated solution is added to the housing 1 containing mixture of water and water soluble dechlorination media 6, the solution will solidify to form a solid plug and completely seals the mixture of water and water soluble dechlorination media 6 in the housing 1. The thickness of the plug is selected so that it will have sufficient rigidity to seal the water and water soluble dechlorination media 6 in the housing 1 while allowing instant release of water soluble dechlorination media 6 to the water. A thickness of 10 mm to 20 mm is found to be satisfactory for this purpose.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A water dechlorination means comprising: a housing containing a water-soluble dechlorination media; one or more fluid transfer media that passes through the housing that allows the transfer of water and water-soluble dechlorination media between the inside of the housing and the outside of the housing; and means for directing water to flow through the one or more fluid transfer media; wherein the chlorine in the water is removed or neutralized by the water-soluble dechlorination media released through the one or more fluid transfer media, wherein the fluid transfer media is selected from the group consisting of felt or wicking materials.

2. A water dechlorination means according to claim 1 wherein the water soluble dechlorination media is ascorbic acid.

3. A water dechlorination means according to claim 1 wherein the water soluble dechlorination media is sodium ascorbate.

4. A water dechlorination means according to claim 1 wherein the water soluble dechlorination media is a sulfur-compounds selected from the group: sodium sulfite, sodium sulfate, calcium sulfite, and calcium sulfate.

5. A water dechlorination means according to claim 1 wherein approximately 5 to 10% by volume of water is enclosed with the water-soluble dechlorination media such that the one or more fluid transfer media is pre-moistened for faster neutralization of the chlorine in water.

6. A water dechlorination means comprising: a housing containing a water-soluble dechlorination media; one or more fluid transfer media that passes through the housing that allows the transfer of water and water-soluble dechlorination media between the inside of the housing and the outside of the housing; and means for directing water to flow through the one or more fluid transfer media, wherein the chlorine in the water is removed or neutralized by the water-soluble dechlorination media released through the one or more fluid transfer media, wherein approximately 5 to 10% by volume of water is enclosed with the water-soluble dechlorination media such that the one or more fluid transfer media is pre-moistened for faster neutralization of the chlorine in water, wherein the water-soluble dechlorination media comprises dampened water-soluble dechlorination media and dry water-soluble dechlorination media, and wherein the housing containing the water-soluble dechlorination media is divided into two compartments by a perforated divider to separate the dampened water-soluble dechlorination media and the dry water soluble dechlorination media such that the one or more fluid transfer media is pre-moistened for faster neutralization of the chlorine in water.

7. A method to dechlorinate water comprising the steps of: placing a water-soluble dechlorination media in physical contact with an end of one or more fluid transfer media; and directing water through the other end of the one or more fluid transfer media so that the water moisturizes the one or more fluid transfer media; wherein after the water passes through the other end of the one or more fluid transfer media, the chlorine in the water is removed or neutralized by the water-soluble dechlorination media released through the one or more moisturized fluid transfer media, and wherein the water-soluble dechlorination media comprises dampened water-soluble dechlorination media and dry water-soluble dechlorination media, and wherein the dampened water-soluble dechlorination media is separated from the dry water soluble dechlorination media by a perforated divider such that the one or more fluid transfer media is pre-moistened for faster neutralization of the chlorine in water.

8. A method to dechlorinate water according to claim 7 wherein the water soluble dechlorination media is ascorbic acid.

9. A method to dechlorinate water according to claim 7 wherein the water soluble dechlorination media is sodium ascorbate.

10. A method to dechlorinate water according to claim 7 wherein the water soluble dechlorination media is a sulfur compound selected from the group: sodium sulfite, sodium sulfate, calcium sulfite, and calcium sulfate.

11. A method to dechlorinate water according to claim 7 wherein fluid transfer media is selected from the group consisting of felt or wicking materials.

12. A method to dechlorinate water according to claim 7 wherein approximately 5 to 10% by volume of water is enclosed with the water-soluble dechlorination media such that the one or more fluid transfer media is pre-moistened for faster neutralization of the chlorine in water.

13. A method to dechlorinate water according to claim 8 wherein the fluid transfer media is selected from the group consisting of felt or wicking materials.

14. A method to dechlorinate water according to claim 9 wherein the fluid transfer media is selected from the group consisting of felt or wicking materials.

15. A method to dechlorinate water according to claim 10 wherein the fluid transfer media is selected from the group consisting of felt or wicking materials.

16. A water dechlorination means comprising: a housing containing a water-soluble dechlorination media sealed by a plug formed by a solidified solution of the water-soluble dechlorination media; one or more fluid transfer media that passes through the housing that allows the transfer of water and water-soluble dechlorination media between the inside of the housing and the outside of the housing; and means for directing water to flow through the one or more fluid transfer media; wherein the chlorine in the water is removed or neutralized by the water-soluble dechlorination media released through the one or more fluid transfer media.

\* \* \* \* \*